United States Patent [19]
Nakazawa et al.

[11] Patent Number: 5,967,489
[45] Date of Patent: Oct. 19, 1999

[54] FLUID CONTROL APPARATUS

[75] Inventors: Masahiko Nakazawa; Kazuo Tsukada, both of Omiya; Michio Yamaji; Hisashi Tanaka, both of Osaka, all of Japan

[73] Assignees: Aera Japan Ltd., Tokyo; Fujikin Incorporated, Osaka, both of Japan

[21] Appl. No.: 08/982,583

[22] Filed: Dec. 2, 1997

[30] Foreign Application Priority Data

Dec. 3, 1996 [JP] Japan ................................. 8-322664
Nov. 7, 1997 [JP] Japan ................................. 9-186580

[51] Int. Cl.[6] .................................................. F16K 51/00
[52] U.S. Cl. .......................... 251/148; 251/152; 137/884
[58] Field of Search ............................. 137/884; 251/367, 251/148, 152

[56] References Cited

U.S. PATENT DOCUMENTS

| | | | |
|---|---|---|---|
| 2,640,492 | 6/1953 | Sawicki | 251/148 |
| 3,424,430 | 1/1969 | Hoelsch | 251/148 |
| 3,548,651 | 12/1970 | Pashke | 137/884 |
| 3,981,482 | 9/1976 | Callahan, Jr. et al. | 251/152 |
| 4,817,670 | 4/1989 | Gogel | 137/884 |
| 5,279,331 | 1/1994 | Fernandez | 137/884 |
| 5,318,072 | 6/1994 | Goedecke | 137/884 |
| 5,333,647 | 8/1994 | Fukano et al. | 137/884 |
| 5,558,129 | 9/1996 | Mayeux | 137/885 |

FOREIGN PATENT DOCUMENTS 3001108  7/1980  Germany ........................... 137/884

*Primary Examiner*—A. Michael Chambers
*Attorney, Agent, or Firm*—Armstrong, Westerman, Hattori, McLeland & Naughton

[57] ABSTRACT

A connecting member connected to an extension of a massflow controller has attached thereto a gatelike member to hold the connecting member from opposite sides thereof. The gatelike member has a pressing member for pressing the extension against the connecting member from immediately above a seal portion between the extension and the connecting member.

8 Claims, 6 Drawing Sheets

FLUID CONTROL APPARATUS

BACKGROUND OF THE INVENTION

The present invention relates to fluid control apparatus comprising a regulator such as a massflow controller for controlling the rate of flow or a pressure regulator for regulating pressure, an on-off valve, etc. in combination.

Fluid control apparatus are known which comprise a regulator for regulating the rate of flow or pressure, a regulatlor extension provided on each of the front and rear sides of lower end or the regulator, and a connecting member butted against the bottom face of the extension, the extension being removably connected to the connecting member with a seal portion interposed there-between so that an inverted L-shaped channel formed in the extension and having an opening in its bottom face communicates with an L-shaped channel formed in the connecting member and having an opening in its upper surface (see JP-A-241400/1994).

With the fluid control apparatus of the type described, it is necessary to frequently perform the procedure of removing the regulator and installing the regulator again for the maintenance and inspection of the regulator. Accordingly, it is desired to mount the fluid control apparatus on an aluminum panel so as to render the regulator singly removable upward. With the conventional fluid control apparatus described, therefore, the regulator is attached to the connecting member by inserting two bolts through the regulator extension and screwing the bolts into respective threaded bores in the connecting member.

With the conventional apparatus, the two bolts are positioned symmetrically on opposite sides of the seal portion. To ensure fluid tightness by the seal portion, there is a need to alternately tighten the two bolts by a small amount each time with consideration given to the balance between the bolts. Thus the apparatus has the problem that this procedure is cumbersome and difficult. Further in the case where the panel for mounting the apparatus thereon is vertical, difficulty is experienced in screwing the bolts into the respective threaded bores in the connecting member, so that the apparatus also has the problem of causing damage to the seal portion by this procedure to result in impaired fluid tightness, and the problem of allowing the bolt to fall off and become lost in removing the regulator.

When the regulator is a massflow controller, the flow rate is controlled on the premise that the fluid flowing into the controller is in the form of a laminar flow, whereas turbulence will occur because the fluid passes through the inverted L-shaped channel and the L-shaped channel before flowing into the massflow controller. This entails the problem of impairing the flow rate control accuracy of the controller.

SUMMARY OF THE INVENTION

An object of the present invention is to provide a fluid control apparatus comprising a regulator which is easy to install and remove.

Another object of the invention is to provide a fluid control apparatus which is free of the likelihood that the members for use in fastening a regulator to a connecting member will become lost.

Another object of the invention is to provide a fluid control apparatus which is improved in sealing property.

Still another object of the invention is to provide a fluid control apparatus which comprises a massflow controller serving as a regulator and operable for controlling the rate of flow with unimpaired accuracy.

The present invention provides a fluid control apparatus comprising a regulator for regulating a flow rate or pressure, a regulator extension provided on each of front and rear sides of a lower end portion of the regulator, and a connecting member butted against a bottom face of the regulator extension, the regulator extension being removably connected to the connecting member with a seal portion interposed therebetween, the fluid control apparatus being characterized in that a gatelike member is attached to the connecting member and has left and right side walls for holding the extension and the connecting member therebetween from left and right opposite sides thereof, the gatelike member having a pressing member for pressing the extension against the connecting member from immediately above the seal portion.

The terms upper and lower as used herein refer respectively to the upper and lower sides of FIG. 1. Further the right-hand side and the left-hand side of the drawing are referred to as front and rear, respectively. The terms upper and lower are used for the sake of convenience; the apparatus may be used as turned upside down or with its upper side positioned laterally. The term regulator refers to a massflow controller, pressure regulator or like device for regulating a flow rate or pressure. The term connecting member refers to a monofunctional member which is to be connected to the regulator, such as an on-off valve, regulating valve, check valve, filter or block formed with a fluid channel.

With the fluid control apparatus of the invention, the pressing member presses the regulator extension against the connecting member from immediately above the seal portion, so that there is no need to consider the fastening balance unlike the case wherein two bolts symmetrically positioned with respect to the seal portion are tightened. The regulator is therefore easy to install.

The pressing member comprises, for example, a male screw portion screwed in a female screw portion extending through a top wall of the gatelike member, a spanner engaging head integral with an upper end of the male screw portion, and a projection in the form of a short cylinder integral with a lower end of the male screw portion. Since only one pressing member is disposed above the seal portion in this case, the male screw portion can be given a greater thickness then in the conventional arrangement wherein two bolts are positioned symmetrically on opposite sides of the seal portion, with the result that the male screw can be given a greater thread pitch. This assures proper tightening by controlling not only the torque but also the number of turns.

Alternatively, the pressing member may comprise a female screw element in the form of a bottomed tube and having a lower end face movable into contact with an upper surface of the extension, and a male screw element screwed in the female screw element, the male screw element comprising a shank upwaraly and downwardly movably inserted through a bore extending through a top wall of the gatelike member, and a spanner engaging head provided at an upper end of the shank and having a bottom face bearing on an upper surface of the top wall of the gatelike member.

Since the bottom face of the head then bears on the upper surface of the gatelike member top wall, the male screw element moves the female screw element upward when Screwed into the female screw element or moves the female screw element down when unscrewed from this element. Further since the female screw element merely moves upward or downward without rotation at this time, the female screw element is thus movable free of the influence of the friction between the lower end face of the female screw element and the upper surface of extension of the controller, hence a stabilized tightening torque value.

Preferably, the connecting member has a through bore extending transversely therethrough, and a rod rotatably inserted through the bore has opposite ends fixed to respective lower ends of the side walls of the gatelike member, the gatelike member being pivotally movable to a position where the gatelike member permits removal and installation of the regulator free of interference therewith. When the regulator is to be removed, the gatelike member can then be pivotally moved so as not to interfere with the regulator to be removed, while the gatelike member is prevented from slipping off from the connecting member. The regulator is therefore removable with ease.

Alternatively, the connecting member has a guide groove extending therethrough transversely of the apparatus and extending longitudinally there, and a rod fitted in the guide groove and movable forward and rearward has opposite ends fixed to respective lower ends of the side walls of the gatelike member, the gatelike member being movable forward or rearward to a position where the gatelike member permits removal and installation of the regulator free of interference therewith. When the regulator is to be removed, the gatelike member is then moved forward or rearward so as not to interfere with the regulator to be removed. In removing the regulator, moreover, the gatelike member is prevented from slipping off from the connecting member. This assures facilitated removal of the regulator.

Preferably, the regulator is formed with positioning pin fitting grooves extending vertically. Positioning pins are provided upright on the panel for mounting the regulator thereon, and are fitted into the respective grooves. This restrains the regulator from moving forward, rearward or transversely of the apparatus, consequently precluding displacement of the seal portion and uneven tightening. In the case where the regulator is to be attached to a vertical panel, the regulator can be prevented from falling off under gravity and can therefore be installed with greater ease.

Preferably, the bottom face of the extension is inclined upward toward a direction away from the regulator, and the connecting member has an inclined face in conformity with and butted against the inclined bottom face. When a force is applied to the extension from above by the pressing member, the bottom face of the extension is pressed against the inclined face of the connecting member with great pressure while slightly sliding, consequently subjecting the seal portion increased pressure to ensure improved fluid tightness.

In the case where the regulator is a massflow controller, and a channel formed in the extension and a channel formed in the connecting member preferably have an obtuse angle of intersection at the butting faces. The fluid flowing into the massflow controller is then less likely to become a laminar flow, with the result that the controller which is designed to control the rate of a laminar flow provides accurate flow rate control without impairment.

DESCRIPTION OF THE PREFERRED EMBODIMENTS

Embodiments of this invention will be described below with reference to the drawings.

Figure 1:
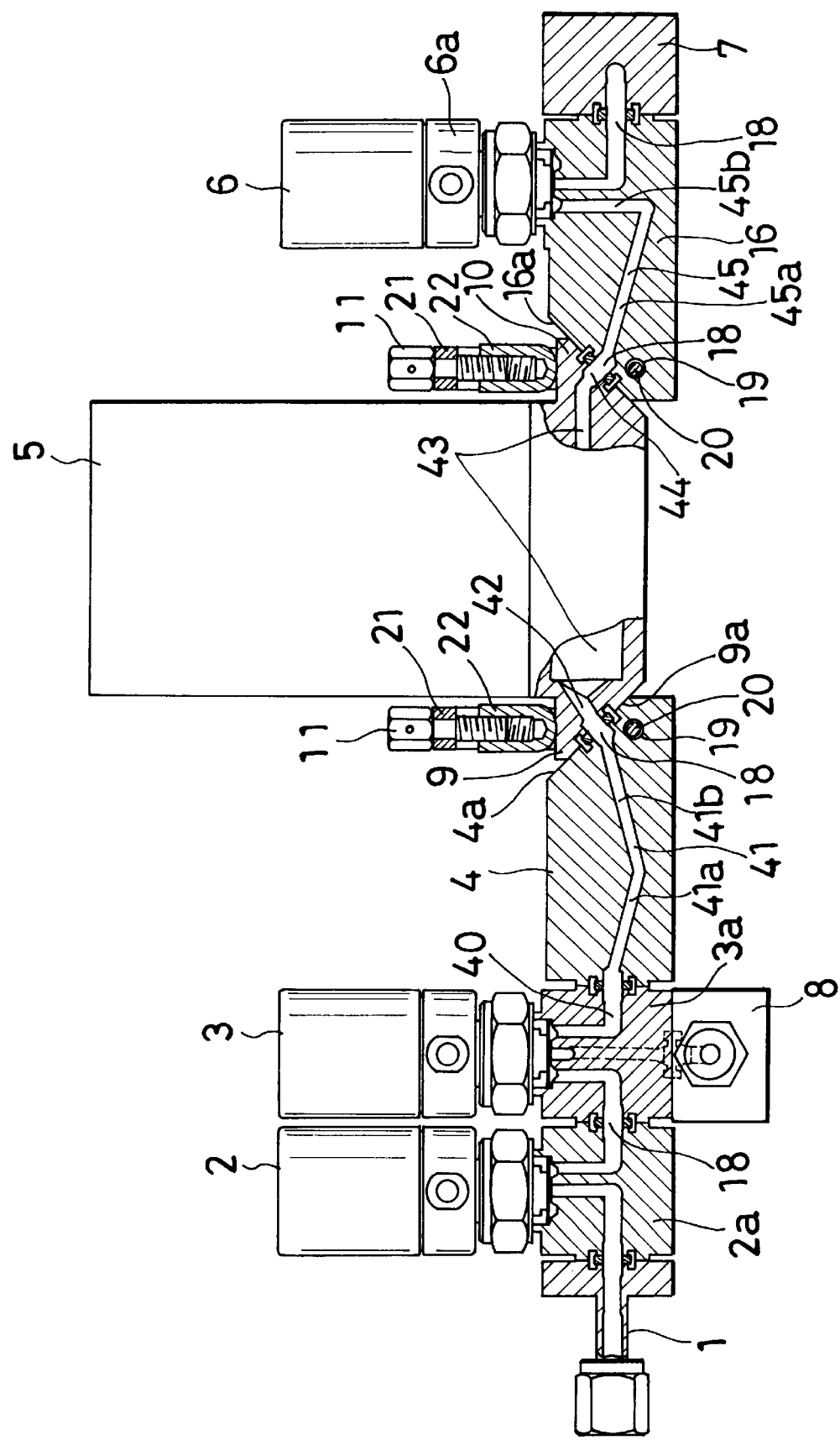
FIG. 1 is a view in vertical section showing a first embodiment of fluid control apparatus of the invention.

FIG. 1 shows a first embodiment of fluid control apparatus for use in semiconductor manufacturing equipment. The embodiment comprises a first fluid inlet portion 1, first on-off valve 2, second on-off valve 3, channel block 4, massflow controller (regulator) 5, third on-off valve 6 and fluid outlet portion 7 which are arranged in this order from the rear forward. A second fluid inlet portion 8 is provided under the second on-off valve 3. The members 1, 2, 3, 4, 5, 6, 7 adjacent to one another longitudinally of the apparatus, as well as the second on-off valve 3 and the second fluid inlet portion 3, are joined to one another with a seal portion 18 of common construction (not shown in detail) interposed therebetween.

The fluid introduced into the first fluid inlet 1, flows through the first on-off valve 2, the second on-off valve 3, a communication channel 41 extending through the channel block 4, the massflow controller 5 and the third on-off valve 6 and is discharged via the fluid outlet portion 7. Further the fluid introduced into the second fluid inlet portion 3 flows through the second on-off valve 3, the channel 41 in the block 4, the massflow controller 5 and the third on-off valve 6 and is discharged from the outlet portion 7.

A rearward extension 9 in the form of a block is provided at the rear side of lower and portion of the massflow controller 5. A forward extension 10 in the form of a block is provided at the front side of lower end portion of the controller 5. The rearward extension 9 of the controller 5 is removably attached to the front end of the channel block 4 by a fastener 11. The forward extension 10 of the controller 5 is attached to the rear end of main body 16 of the third on-off valve 6 in the same manner.

Each of the fasteners 11 comprises a rotatable rod 20 rotatably inserted through a bore 19 extending through the front end of the channel block 4 or the rear and of main body 16 of the third on-off valve 6 transversely of the apparatus, a gatelike member 21 mounted on the rotatable rod 20, and a pressing member 22 for pressing the extension 9 or 10 of the massflow controller 5 from above the seal portion 18 against the block 4 or the third on-off valve main body 16 as will be described later in greater detail.

The rearward extension 9 has a bottom face 9a in the form of a slope inclined forwardly downward at an angle of about 45 deg. The extension 9 has an inflow channel 42 communicating with a channel 43 in the main body of the massflow controller 5 for passing a fluid therethrough from the rear forward. The inflow channel 42 has an inclination smaller than a right angle with respect to the bottom face 9a of the extension 9. Consequently, the inflow channel 42 forms an obtuse angle of about 150 deg with the channel 43 in the main body of the massflow controller.

The forward extension 10 has a bottom face 10a in the form of a slope inclined forwardly upward at an angle of about 45 deg. The extension 10 has an outflow channel 44 communicating with the channel 43 in the massflow controller 5. The outflow channel 44 extends in a direction approximately perpendicular to the bottom face 10a of the extension 10. Consequently, the outflow channel 44 forms an obtuse angle of about 135 deg with the controller main body channel 43.

The channel block 4 provided between the second on-off valve 3 and the massflow controller 5 is formed with the communication channel 41 for causing the outflow channel 40 in the main body 3a of the second-off valve 3 to communicate with the inflow channel 42 or the rearward extension 9 of the controller 5. The block 4 has a front-end upper face 4a butting against the controller rearward extension 9 and in the form of a slope inclined forwardly downward in conformity with the forwardly downward bottom face 9a of the extension 9.

The communication channel 41 of the channel block 4 comprises an upstream portion 41a communicating with an inflow channel 40 of the second on-off valve 3, and a downstream portion 41b communicating with the inflow channel 42 of the controller 5. The upstream portion 41a is slightly inclined forwardly downward, the downstream portion 41b is slightly inclined forwardly upward, and these portions 41a and 41b make an obtuse angle of about 150 deg. The downstream portion 41b has an inclination smaller than a right angle with respect to the front-end upper face 4a of the block 4. Consequently, the downstream portion 41b makes an obtuse angle of about 165 deg with the inflow channel 42 of the controller 5.

The length of main body 3a of the second on-off valve 3 is equal to that of the main body 2a of the first one-off valve. The main body 16 of the third on-off valve 6 has approximately twice the length of the main body 2a of the first on-off valve 2. The third on-off vale 6 has an actuator portion 6a which is provided in the front half of the valve main body 16. The main body 16 of the third on-off valve 6 has a rear-end upper face 16a butting against the forward extension 10 of the controller 5 and in the form of a slope which is inclined forwardly upward at the same angle as the forwardly upward bottom face 10a of forward extension 10 of the controller 5, i.e., about 45 deg. The third on-off valve 6 has an inflow channel 45 which comprises an upstream portion 45a extending forwardly downward from the front end of outflow channel 44 of the controller forward extension 10. and a downstream portion 45b extending vertically upward from the front end of the upstream portion 45a. The upstream portion 45a has a smaller inclination than a right angle with respect to the rear-end upper face 16a of the third on-off valve main body 16. Consequently, the inflow channel upstream portion 45a of the main body 16 makes an obtuse angle of about 150 deg with the outflow channel 44 of the controller 5. The upstream mortion 45a further forms an acute angle of about 75 deg with the downstream portion 45b.

With the fluid control apparatus, the fluid flowing out from the outflow channel 40 of the second on-off valve 3 flows through the communication channel upstream portion 41a of the channel block 4, the downstream portion 41b making an obtuse angle with the portion 41a and the inflow channel 42 of the controller rearward extension 9 making an obtuse angle with the portion 41b, enters the channel 43 of the controller main body making an obtuse angle with the channel 42, and further flows through the forward extension outflow channel 44 making an obtuse angle with the channel 43 into the inflow channel upstream portion 45a of the third on-off valve 6 making an obtuse angle with the channel 44. Thus, the channels 41a, 41b, 42, 43, 44, 45a in front and rear of the massflow controller 5 all make an obtuse angle with one another. This assures that the fluid through the channel 43 in the controller main body will be in the form of a laminar flow. This obviates the problem of the conventional fluid control apparatus that the passage through the inverted L-shaped channel and L-shaped channel before entering the massflow controller produces turbulence to impair the flow control accuracy of the controller.

Next with reference to FIGS. 2 and 3, a detailed description will be given of the fastener 11 for attaching the controller rearward extension 9 to the channel block 4. FIG. 3 is a view in section taken along the line III—III of FIG. 2, which is an enlarged view of FIG. 1. The left- and right-hand sides of FIG. 3 correspond respectively to the terms left and right as used herein.

With reference to FIG. 3, the gatelike member 21 comprises left and right side walls 21a, and a top wall 21b. The spacing between the lower portions of the side walls 21a is made equal to the left-to-right widths of the rearward extension 9 and the channel block 4. The side wells have upper portions which are so inclined as to decrease the spacing therebetween. The top wall 21b has a bore 28 extending from its top downward therethrough and circular in cross section, and a recess 29 communicating with the lower end of the bore 28, rectangular in cross section, opened downward and having a greater cross sectional area than the bore 28. As will be described later, the bore 28 serves to guide a male screw element 23 oil the pressing member 22, and the recess 29 serves to guide a female screw element 24 of the pressing member.

Each side wall 21a is formed with a hole 30 in its lower end. The rotatable rod 20 has its opposite ends fixedly fitted in the respective holes 30, whereby the gatelike member 21 is made pivotally movable about the axis of the rod 20 extending transversely of the apparatus, and the fastener 11 is prevented from falling off. This structure for making the member 21 pivotally movable and preventing the fastener 11 from falling off is not limitative; the rod 20 may be replaced by opposed flanged pins loosely inserted through the respective holes 30 of the side walls 21a from outside having their inner ends inserted into a through bore 19 19 of the channel block 4 by a press fit.

The pressing member 22 comprises the above-mentioned elements, i.e., the female screw element 24 in the form of a tube having a bottom, and the male screw element 23 screwed in the element 24.

The female screw element 24, which is a tube having an approximately circular cross section, is internally threaded and formed on its outer periphery with a pair of left and right flat faces 24a parallel to each other. The distance between the flat faces 24a is made approximately equal to the left-to-right width of the female element guide recess 29 formed in the bottom of top wall 21b of the gatelike member 21. The female screw element 24 has an upper and portion fitted in the recess 29 slidably and nonrotatably, and a lower end face which is movable into or out of contact with the upper surface of extension 9 or 10 of the massflow controlle 5 with the rotation of the male screw element 23. The extension 9 or 10 is formed in its upper surface with a cavity 39 circular-arc in vertical section and extending transversely of the apparatus for receiving the lower end face, circular-arc in vertical section, of the female screw element 24 to position the pressing member 22 in place when the controller 5 is installed.

The male screw element 23 comprises a shank 25 inserted through the bore 28 of the gatelike member top wall 21b and movable upward or downward, a spanner engaging head 26 provided at the upper end of the shank 25 and having a lower face bearing on the upper surface of the top wall 21b, and an externally threaded portion 27 extending from the lower end of the shank 25 and having a slightly greater diameter than the shank 25. The head 26 has a regular hexagonal cross section and a socket 26a facing downward and having fitted therein the upper end of the shank 25 projecting upward beyond the top wall 21b. The shank 25 is connected to the head 26 by a spring pin 31. A collar 32 interposed between the upper end of the externally threaded portion 27 and the bottom of the top wall 21b is fitted around the lower end of the shank 25. The heed 26 may be square in cross section, or may have a circular cross section and a spanner engaging socket in its top.

With the fastener 11 wherein the head 26 of the male screw element 23 bears on the upper surface of the gatelike member top wall 21b, the male screw element 23 moves the female screw element 24 upward when screwed into the female screw element 24 or moves the element 24 down when unscrewed from the element 24. Since the female screw element 24 merely moves upward or downward without rotation at this time, the element 24 is thus movable free of the influence of the friction between the lower end face of the element 24 and the upper surface of extension 9 or 10 of the controller 5, hence a stabilized tightening torque value. The male and female screw elements 23 and 24 may be right-handed or left-handed, whereas when the element 24 is to be pressed against the extension by rotating the male screw element 23 rightward, both the screw elements 23, 24 are left-handed.

Figure 2:
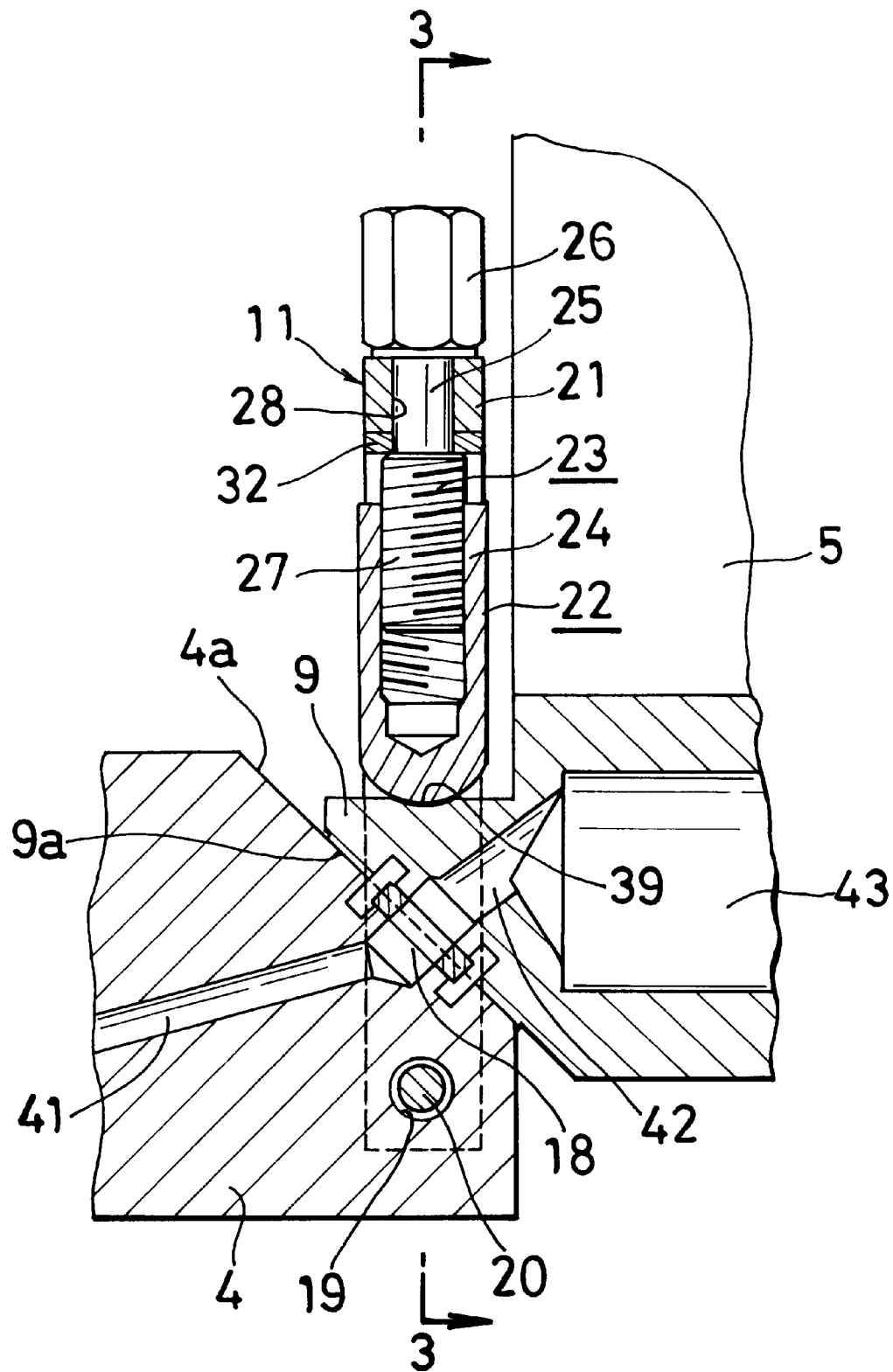
FIG. 2 is an enlarged fragmentary view of FIG. 1.
Figure 3:
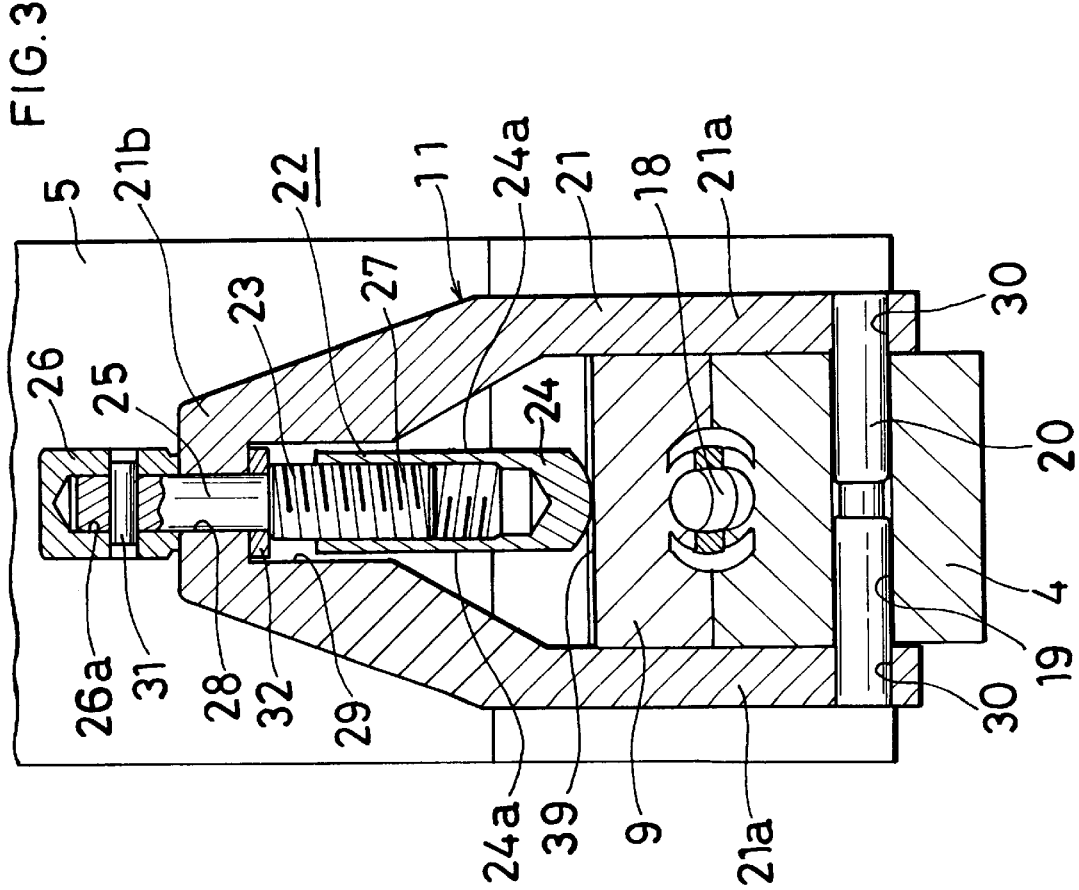
FIG. 3 is a view in section taken along the line 3—3 in FIG. 2.

The massflow controller 5 is removable upward by moving the female screw element 24 in the state shown in FIGS. 1 to 3 upward and then turning the element away from the controller 5. When the controller 5 is to be installed, the controller extension 9 and the channel block 4 have their left and right sides held between the lower portions of the side walls 21a and are thereby positioned in place transversely of the apparatus, so that even if the canal on which the apparatus is to be installed is vertical, the apparatus can be installed efficiently without necessitating much time for positioning or effecting screw-thread engagement. This obviates problems such as causing damage to the seal portions during the installation procedure to result in impaired fluid tightness.

Figure 4:
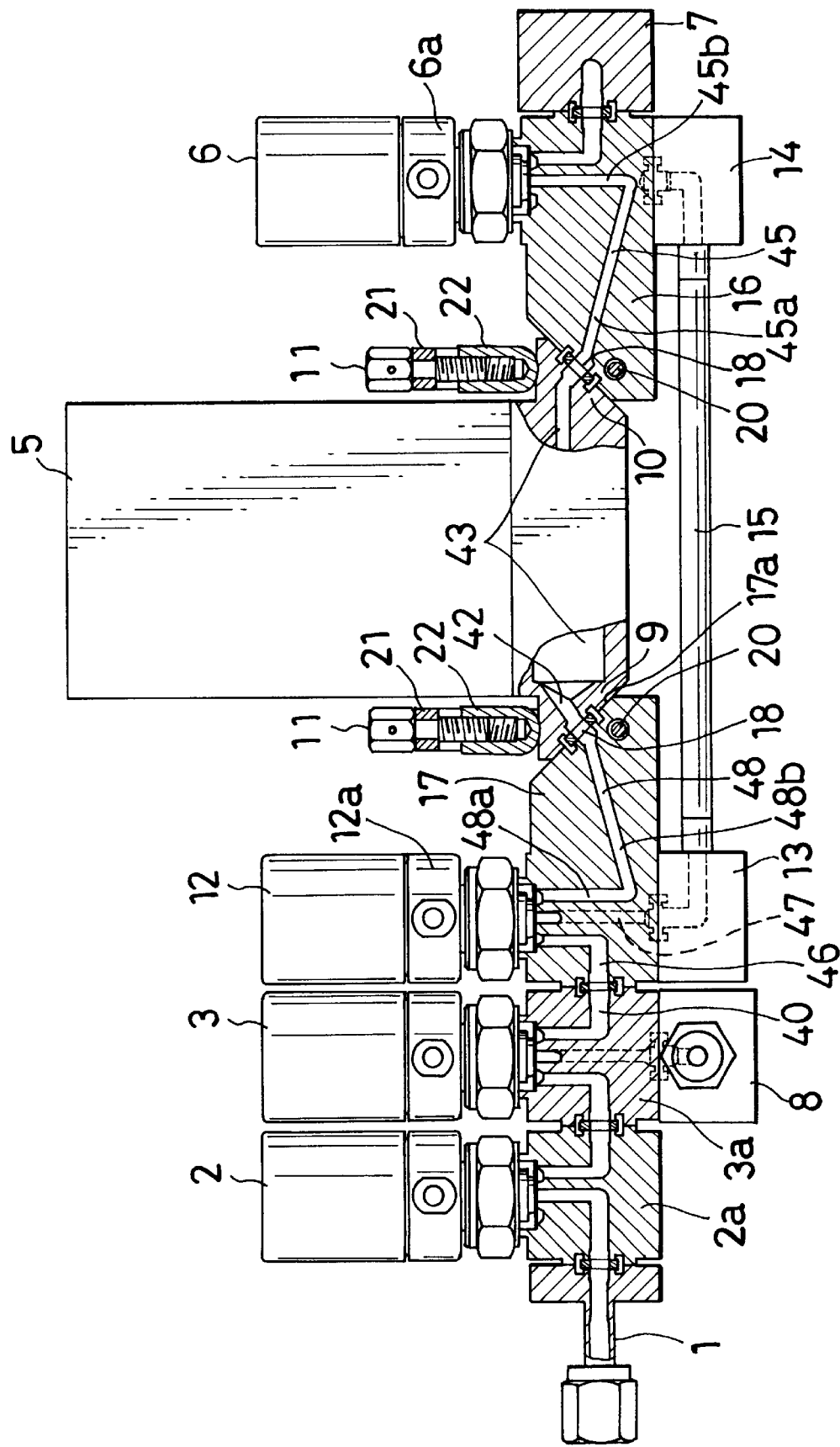
FIG. 4 is a view in vertical section showing a second embodiment of fluid control apparatus of the invention.

FIG. 4 shows a second embodiment of fluid control apparatus for use in semiconductor manufacturing equipment. The embodiment comprises a first fluid inlet portion 1, first on-off valve 2, second on-off valve 3, fourth on-off valve 12, massflow controller 5, third on-off valve 6 and fluid outlet portion 7 which are arranged in this order from the rear forward. A second fluid inlet portion 8 is provided under the second on-off valve 3. Channel blocks 13, 14 are provided under the fourth on-off valve 12 and the third on-off valve 6, respectively, and interconnected by a tube 15.

The first fluid inlet portion 1, first on-off valve 2, second on-off valve 3, massflow controller 5 and fluid outlet portion 7 are the same as those in the first embodiment. The main body 16 of the third on-off valve 6 is additionally provided with a channel communicating with the channel block 14.

The fourth on-off valve 12 has a main body 17 in the form of a block. The main body 17 has approximately twice the length of the main body 2a of the first on-off valve 2. The valve 12 has an actuator portion 12a which is provided on the rear half of the valve main body 17. The valve main body 17 has a front-end upper face 17a which is in the form of a slope inclined forwardly downward at the same angle as the bottom face 9a of rearward extension 9 of the controller 5, i.e., about 45 dag. The upper face 17a is butted against the bottom face 9a of the extension 9.

The fourth on-off valve 12 has an outflow channel 48, which comprises a downwardly extending upstream portion 48a, and a downstream portion 48b communicating with the inflow channel 42 of the controller 5. The upstream portion 48a makes an acute angle of about 75 deg with the downstream portion 48b which is slightly inclined forwardly upward. The downstream portion 48b has an inclination smaller than a right angle with respect to the front-end upper face 17a of the valve main body 17, Consequently, the outflow channel downstream portion 48a of the fourth on-off valve forms an obtuse angle or about 165 deg with the inflow channel 42 of the massflow controller 5.

With the second embodiment, the channel block 4 of the first embodiment is replaced by the fourth on-off valve 12. With respect to the first and second embodiments, like parts are designated by like reference numerals or symbols and will not be described repeatedly.

According to the first and second embodiments, the massflow controller 5 is connected to the channel block 4 or the valve main body 17, and to the valve main body 16, whereas the controller 5 may be replaced by a regulator such as a pressure regulator or one of various valves for regulating the rate of low or pressure. In addition to the valve main body 16, or the valve main body 17 or channel block 4, a filter or other member may be connected to such a regulator or valve in a suitable combination to provide a fluid control apparatus.

Alternatively, the pressing member may be a rotatable eccentric rod extending through the left and right side walls 21a of the gatelike member 21 and having a short radius portion and a long radius portion. When rotated, the eccentric rod is brought alternatively to a state wherein the short radius portion is opposed to the extension 9 or 10 of the controller 5, creating a clearance between the eccentric rod and the extension 9 or 10, or to a state wherein the long radius portion is in pressing contact with the upper surface of the extension 9 or 10. Thus, the pressing member 22 or the eccentric rod presses the bottom face 9a (10a) of the controller extension 9 (10) against the butt face 4a of the channel block 4 or the butt face 17a of the valve main body 17 (the butt face 16a of the valve main body 16) immediately from above the seal portion 18. When the extension is to be fastened to the channel block or valve main body with two bolts positioned symmetrically with the seal portion 18, the bolts must be tightened in balance, whereas such balance need not be considered in the structure described.

The bottom faces 9a, 10a of the extensions 9, 10 and the butt faces 4a, 16a, 17a of the block 4 and the valve main bodies 16, 17 are slopes according to the foregoing embodiments, whereas the fasteners 11 are usable even if these butt faces 9a, 10a, 4a, 16a, 17a are not slopes. While the channels 41a; 41b, 42, 43, 44, 45a, 48b in front and rear of the massflow controller 5 make an obtuse angle with one another, this arrangement is usable even if the butt faces 9a, 10a, 4a, 16a, 17a are not inclined.

Figure 7:
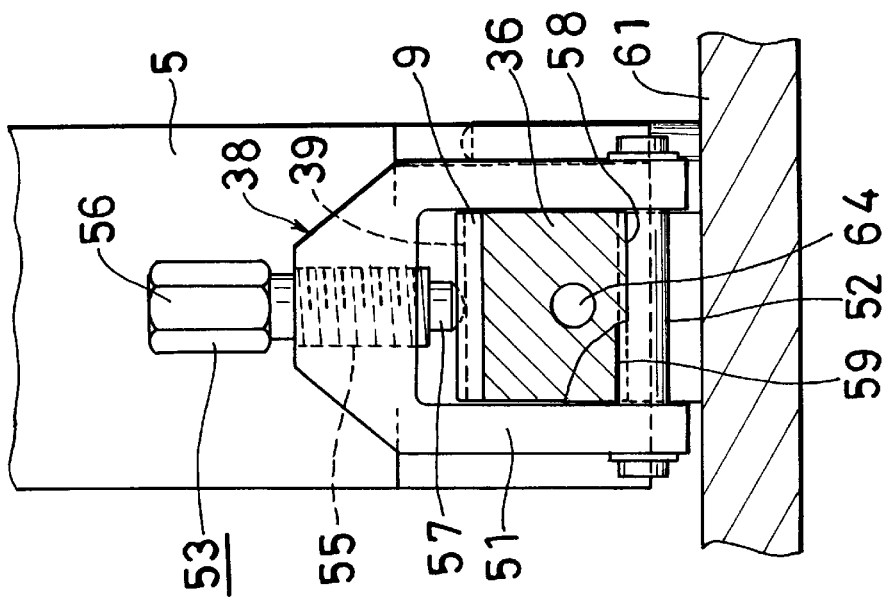
FIG. 7 is a view in section taken along the line 7—7 in FIG. 6.
Figure 5:
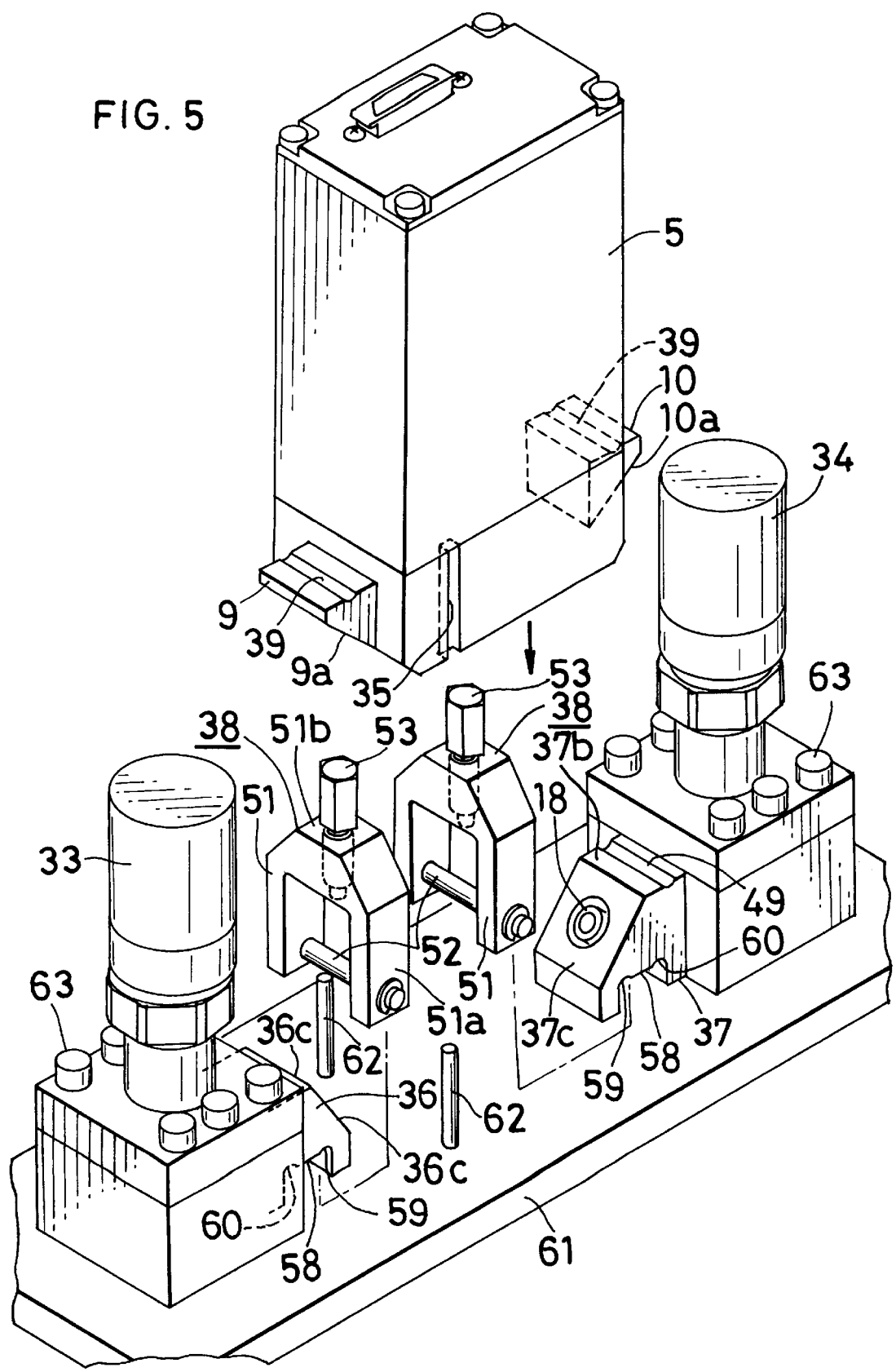
FIG. 5 is a view in vertical section showing a third embodiment of fluid control apparatus of the invention.
Figure 6:
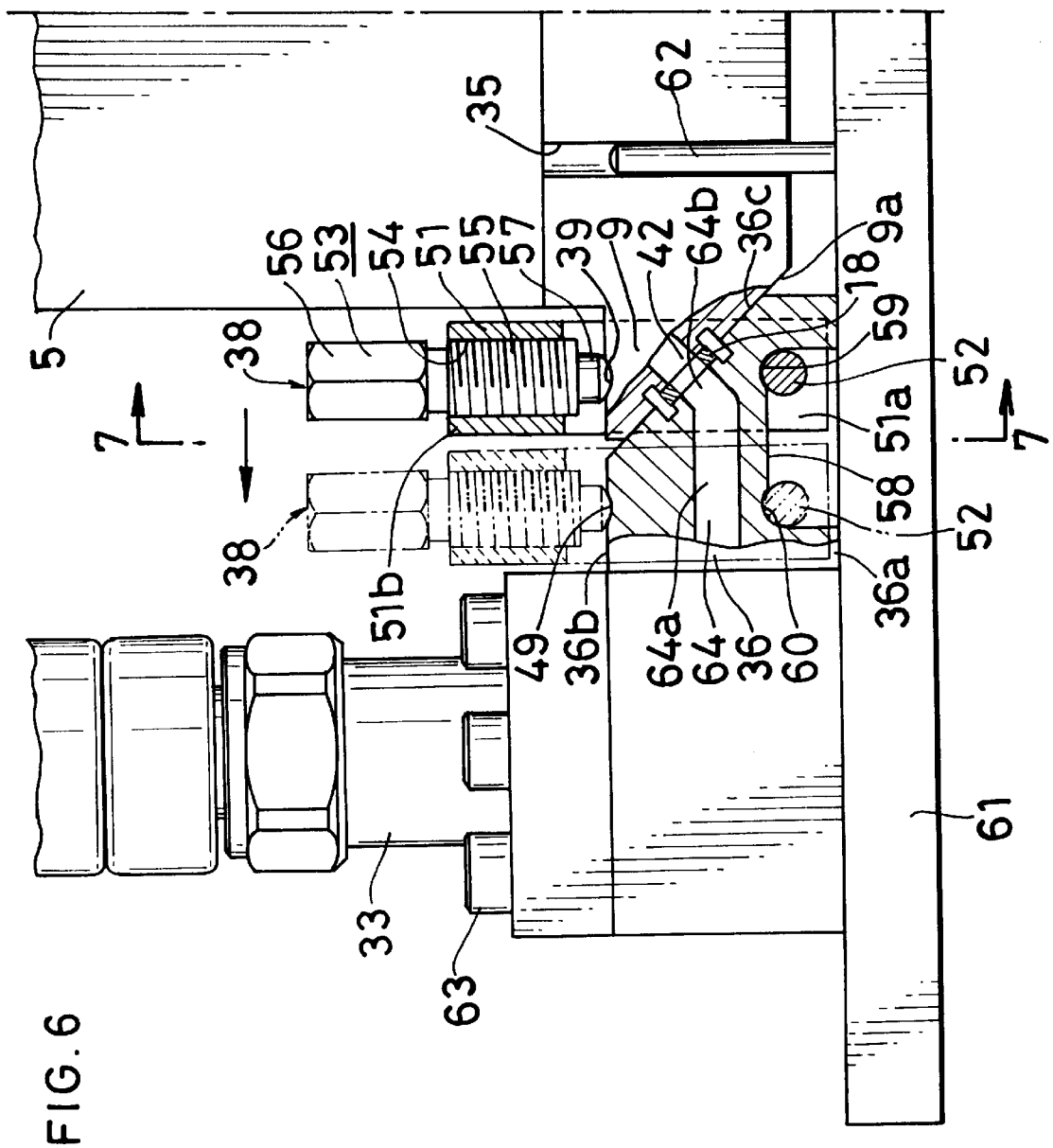
FIG. 6 is an enlarged fragmentary view of FIG. 5.

Although the gatelike member 21 is attached to the connecting member 4, 16 or 17 so as to be pivotally movable about a transverse axis according to the foregoing embodiments, the member 21 may be attached to the connecting member so as to be movable forward and rearward. FIGS. 5 to 7 show such an embodiment (third embodiment).

With reference to FIG. 5, the third embodiment of fluid control apparatus comprises a massflow controller 5, and first and second on-off valves 33, 34 arranged respectively at the rear side and the front side of the controller.

The controller 5 differs from those of the foregoing embodiments in that it is formed in each of its left and right sides with a vertical pin fitting groove 35 extending to the lower end of the controller. Accordingly, the same reference numerals as in the foregoing embodiments are used for the controller 5 to avoid repeated description.

The first on-off valve 33 has a blocklike forward extension 36 at the front side of its main body. The second on-off valve 34 has a blocklike rearward extension 37 at the rear side of its main body.

The forward extension 36 of the first on-off valve 33 has a flat bottom face 36a, an upper face 36b parallel to the face 36a and having a front end rearward of that of the bottom face 36a, and a slanting face 36c inclined downward from the front end of the upper face 36b and in conformity with the bottom face 9a of rearward extension 9 of the controller 5. The rearward extension 37 of the second on-off valve 34 has a flat bottom face 37a, an upper face 37b parallel to the face 37a and having a rear end forward of that of the bottom face 37a, and a slanting face 37c inclined downward from the rear end of the upper face 37a and in conformity with the bottom face 10a of forward extension 10 of the controller 5.

As seen in FIG. 6, the forward extension 36 of the first on-off valve 33 is formed with an outflow channel 64 communicating with the controller 5 and comprising a horizontal upstream portion 64a, and a downstream portion 64b orthogonal to the slanting face 37c. The upstream portion 64a makes an obtuse angle of about 145 deg with the downstream portion 64b. The angle between the downstream portion 64b and the inflow channel 42 of the controller 5 is 180 deg.

The rearward extension 9 of the controller 5 is removably attached to the forward extension 36 of the first on-off valve 33 by a fastener 38. The forward extension 10 of the controller 5 is similarly attached to the rearward extension 37 of the second on-off valve 34.

Each of the fasteners 38 comprises gatelike member 51 including left and right side walls 51a opposed to each other as spaced apart by a distance equal to the left-to-right width of the extension 36 or 37 of the valve 33 or 34, and a top wall 51b formed with a female screw portion 54 extending therethrough; a horizontal rod 52 connected between the lower ends of the member 51; and a pressing member 53 extending through the female screw portion 54 of the gatelike member 51 in screw-thread engagement therewith for pressing the extension 9 or 10 against the valve extension 36 or 37.

As shown on an enlarged scale in FIG. 6, the pressing member 53 comprises a male screw portion 55 screwed in the female screw portion 54 of the gatelike member 51, a spanner engaging head 55 integral with the upper end of the portion 55, and a projection 57 integral with the lower end of the male screw portion 55, in the form of a short cylinder and having a lower end face with a circular-arc vertical section.

As previously described, the rearward or forward extension 9 or 10 of the massflow controller 5 is formed in its upper surface with the cavity 39 circular-arc in vertical section and extending transversely or the apparatus for receiving the lower end face of the projection 57 of the pressing member 53 to position the pressing member in place when the controller 5 is installed. The upper surfaces 36b, 37b of extensions 36, 37 of the on-off valves 33, 34 are also each formed with a cavity 49 shaped similarly for positioning the pressing member 53 in place when the controller 5 is to be removed.

The lower surfaces 36a, 37a of extensions 36, 37 of the on-off valves 33, 34 are each formed with a guide groove 58 for guiding the horizontal rod 52 of the fastener 38. The guide groove 58 is open downward, and the bottom face of the grooved portion 58 is formed at its front and rear end with respective cavities 59, 60 circular-arc in vertical section and extending transversely of the apparatus for the horizontal rod 52 to engage in to position the rod 52 in place when the controller is installed and when it is to be removed. As seen in FIG. 6, the rod positioning cavity 59 for the installation of the controller is positioned below the pressing member positioning cavity 39 for the installation of the controller. The rod positioning cavity 60 for the removable of the controller is positioned below the pressing member positioning cavity 49 of extension 36 or 37 of the valve 33 or 34 for the removal of the controller. The center of the cavity 39 and the center of the cavity 59 are arranged on a vertical line above and below the center of the seal portion 18, respectively.

A panel 61 for mounting the massflow controller 5 and the on-off valves 33, 34 thereon is provided with a pair of left and right vertical guide pins 62 fittable in the respective pin fitting grooves 35 in the controller 5.

The massflow controller 5 and the on-off valves 33, 34 are mounted on the panel 61 by the procedure to be described below with reference to FIGS. 6 and 7 (in which the second valve 34 is not shown).

The first and second on-off valves 33, 34 are first fastened to the panel 61 from above. Next, the horizontal rod 52 of each fastener 38 wherein the male screw portion 55 is unscrewed is fitted into the guide groove 58 of each of the extensions 36, 37 of the valves 33, 34 the projection 57 of the pressing member 53 is positioned above the cavity 49, and the rod 52 is fitted to the cavity 60. The male screw portion 55 of the pressing member 53 is tightened in this state, whereby the fastener 38 is temporarily held in a position where the fastener will not interfere with the massflow controller 5 to be mounted as indicated in broken lines in FIG. 6. The guide pins 62 are then fitted into the grooves 35 in the controller 3, whereby the bottom face 9a of rearward extension 9 of the controller 9 is butted against the slanting face 36c of forward extension 36 of the first valve 33, and the bottom face 10a of forward extension of the controller 5 against the slanting face 37c of rearward extension 37 of the second valve 34. The male screw portion 55 of each pressing member 53 is subsequently loosened, the horizontal rod 52 is moved toward the controller 5 along the guide groove 58, the projection 57 of the pressing member 53 is positioned above the recess 39, and the rod 52 is fitted into the cavity 59. When the male screw portion 55 of each pressing member 53 is then progressively screwed in, the projection 37 of the pressing member 53 fits into the cavity 39. Consequently, the controller 5 is connected to the first and second on-off valves 33, 34. The rod positioning cavity 59 for the installation of the controller and the pressing member positioning cavity 39 for the installation of the controller determine the position of the fastener 38, whereby the extension 9 (10) of the controller 5 is pressed against the extension 36 (37) of the valve 33 (34).

When the controller 5 is to be removed, the male screw portion 55 of each pressing member 53 is loosened, and the horizontal rod 52 is moved along the guide groove 58 to position the projection 57 of the pressing member 53 above the cavity 49, fit the rod 52 in the cavity 60 and temporarily hold the fastener 38. The controller is thereafter removed upward.

The controller 5 is positioned in place for installation by fitting the guide pins 62 into the grooves 35 of the controller 5, and also by the side walls 51a of each gatelike member 51 holding the controller extension 9 (10) and extension 36 (37) of the valve 33 (34) from opposite sides thereof. Accordingly, the controller 5 is restrained from moving forward, rearward or transversely, so that even if the panel for mounting the apparatus thereon is vertical, the controller can be positioned in place and the bolts can be screwed into the respective threaded bores without necessitating much time, hence an improved work efficiency. The above feature also obviates the problem of causing damage to the seal portions by the work to impair the sealing property, and the problem of displacement of the seal portions and uneven tightening.

According to the third embodiment, the massflow controller 5 can be installed to the panel 61 as positioned vertically, without falling off under gravity. This assures a further facilitated installation procedure. The fastener 38 can be held temporarily and is therefore unlikely to pivotally move downward under gravity and to block, for example, the space for the installation of the controller 5, even if the panel 61 is vertical. The arrangement described is thus advantageous especially for mounting the controller 5, etc. on the vertical panel 61.

The fastener 11 of the first and second embodiments and the fastener 38 of the third embodiment are interchangeable. The fastener 11 of the first and second embodiments may be incorporated into the third embodiment, while the fastener 38 of the third embodiment is usable in the form of the first or second embodiment.

With the fasteners 11, 38 of the first to third embodiments, the pressing member 53 having the male screw member 23 or the male screw portion 55 is singly disposed above the seal portion 18. The male screw portion 27 or 55 can therefore be given a greater thickness than in the conventional arrangement wherein two bolts are positioned symmetrically on opposite sides of the seal portion 18, with the result that the male screw portion 27 or 55 can be given a greater thread pitch. This assures proper tightening by controlling not only the torque but also the number of turns.

As will be apparent from FIGS. 2 and 6, when a downward force is applied to the controller extension 9 or 10 from above by the pressing member 22 or 53 in the first to third embodiments, the bottom face 9a or 10a of extension 9 or 10 of the controller 5 is pressed against the butt face 4a, 16a, 36c or 37c or the block 4 or valve 6, 33 or 34 with a great pressure while slightly sliding along the butt face. Thus, the extension 9 or 10 acts like a wedge to give an increased pressure to the seal portion 18 and assure improved fluid tightness.

When installing the controller 5, it is necessary to alternately tighten the forward fastener 11 or 38 and the rearward fastener 11 or 38 in good balance. With the conventional fluid control apparatus, there is a need to tighten two left and right bolts in the front and two left and right bolts in the rear while maintaining front-rear balance and also left-right balance, whereas use of the fasteners of the invention achieves a remarkable improvement in work efficiency over the conventional arrangement.

What is claimed is:

1. A fluid control apparatus comprising a regulator for regulating a flow rate or pressure, a regulator extension provided on each of front and rear sides of a lower and portion of the regulator, and a connecting member butted against a bottom face of the regulator extension, the regulator extension being removably connected to the connecting member with a seal portion interposed therebetween, the fluid control apparatus being characterized in that a gatelike member is attached to the connecting member and has left and right side walls for holding the extension and the connecting member therebetween from left and right opposite sides thereof, the gatelike member having a pressing member for pressing the extension against the connecting member from immediately above the seal portion.

2. A fluid control apparatus according to claim 1 wherein the connecting member has a through bore extending transversely therethrough, and a rod rotatably inserted through the bore has opposite ends fixed to respective lower ends of the side walls of the gatelike member, the gatelike member being pivotally movable to a position where the gatelike member permits removal and installation of the regulator free of interference therewith.

3. A fluid control apparatus according to claim 1 wherein the connecting member has a guide groove extending therethrough transversely of the apparatus and extending longitudinally thereof, and a rod fitted in the guide groove and movable forward and rearward has opposite ends fixed to respective lower ends of the side walls of the gatelike member, the gatelike member being movable forward or rearward to a position where the gatelike member permits removal and installation of the regulator free of interference therewith.

4. A fluid control apparatus according to claim 1 wherein the regulator is formed with positioning pin fitting grooves extending vertically.

5. A fluid control apparatus according to claim 1 wherein the bottom face of the extension is inclined upward toward a direction away from the regulator, and the connecting member has an inclined face in conformity with and butted against the inclined bottom face.

6. A fluid control apparatus according to claim 5 wherein the regulator is a massflow controller, and a channel formed in the extension and a channel formed in the connecting member have an obtuse angle of intersection at the butting faces.

7. A fluid control apparatus according to claim 1 wherein the pressing member comprises a male screw portion screwed in a female screw portion extending through a top wall of the gatelike member, a spanner engaging head integral with an upper end of the male screw portion, and a projection in the form of a short cylinder integral with a lower end of the male screw portion.

8. A fluid control apparatus according to claim 1 wherein the pressing member comprises a female screw element in the form of a bottomed tube and having a lower and face movable into contact with an upper surface of the extension, and a male screw element screwed in the female screw element, the male screw element comprising a shank upwardly and dowrwardly movably inserted through a bore extending through a top wall of the gatelike member, and a spanner engaging head provided at an upper and of the shank and having a bottom face bearing on an upper surface of the top wall of the gatelike member.

* * * * *